(12) United States Patent
Chang et al.

(10) Patent No.: US 8,737,061 B2
(45) Date of Patent: May 27, 2014

(54) HEAT DISSIPATING APPARATUS

(75) Inventors: Chien-Lung Chang, Jiangsu (CN); Hai-Wei Cong, Jiangsu (CN)

(73) Assignee: Asus Technology Pte Ltd., Eightrium (SG)

( * ) Notice: Subject to any disclaimer, the term of this patent is extended or adjusted under 35 U.S.C. 154(b) by 217 days.

(21) Appl. No.: 13/238,753

(22) Filed: Sep. 21, 2011

(65) Prior Publication Data

US 2012/0075798 A1 Mar. 29, 2012

(30) Foreign Application Priority Data

Sep. 27, 2010 (TW) .............................. 99132620 A (51) Int. Cl.
*H05K 7/20* (2006.01)
(52) U.S. Cl.
USPC ...... 361/679.54; 361/704; 361/715; 361/719; 165/80.2; 165/80.3; 165/104.33
(58) Field of Classification Search
USPC ....................... 361/679.46–679.54, 690–697, 361/700–712, 715, 719–724; 165/80.2–80.5, 104.21, 104.26, 165/104.33, 185; 174/15.1, 16.3, 252; 29/890.03, 890.032, 890.04, 890.041, 29/890.043, 890.054; 257/706–727
See application file for complete search history.

(56) References Cited

U.S. PATENT DOCUMENTS

| | | | | |
|---|---|---|---|---|
| 5,398,748 A * | 3/1995 | Yamaji et al. | ................ | 165/80.2 |
| 5,959,837 A * | 9/1999 | Yu | ................... | 361/697 |
| 5,960,865 A * | 10/1999 | Costa et al. | .................... | 165/86 |
| 6,937,474 B2 * | 8/2005 | Lee | ................ | 361/715 |
| 7,319,588 B2 * | 1/2008 | Peng et al. | ..................... | 361/700 |
| 7,369,412 B2 * | 5/2008 | Peng et al. | ..................... | 361/715 |
| 7,492,596 B1 * | 2/2009 | Peng et al. | ..................... | 361/700 |
| 7,515,423 B2 | 4/2009 | Peng et al. | | |
| 7,755,900 B2 | 7/2010 | Cheng | | |
| 2006/0032616 A1 * | 2/2006 | Yang | ........................ | 165/104.33 |
| 2007/0146995 A1 * | 6/2007 | Zhao et al. | .................... | 361/697 |
| 2007/0215319 A1 * | 9/2007 | Chen et al. | ................... | 165/80.3 |
| 2008/0192427 A1 | 8/2008 | Wu et al. | | |
| 2008/0196864 A1 * | 8/2008 | Lin et al. | ....................... | 165/80.2 |
| 2009/0052483 A1 * | 2/2009 | Lin et al. | ........................ | 372/36 |
| 2009/0154103 A1 * | 6/2009 | Liu | ................ | 361/700 |
| 2009/0211730 A1 * | 8/2009 | Zhou et al. | .................... | 165/80.3 |

FOREIGN PATENT DOCUMENTS

| | | |
|---|---|---|
| CN | 2772024 Y | 4/2006 |
| TW | M247918 | 10/2004 |
| TW | 200605766 B | 12/2004 |

* cited by examiner

*Primary Examiner* — Michail V Datskovskiy
(74) *Attorney, Agent, or Firm* — Muncy, Geissler, Olds & Lowe, P.C.

(57) ABSTRACT

A heat dissipating apparatus comprises a first heat sink, a second heat sink and a fixing unit. The first heat sink comprises a connecting portion. The second heat sink comprises a connecting unit which is inserted into the connecting portion. The fixing unit includes an end portion exposed outside the connecting portion and a body accommodated in the connecting portion.

10 Claims, 8 Drawing Sheets

HEAT DISSIPATING APPARATUS

CROSS REFERENCE TO RELATED APPLICATIONS

This Non-provisional application claims priority under 35 U.S.C. §119(a) on Patent Application No(s). 099132620 filed in Taiwan, Republic of China on Sep. 27, 2010, the entire contents of which are hereby incorporated by reference.

BACKGROUND OF THE INVENTION

1. Field of Invention

The disclosure relates to a heat dissipating apparatus and, more particularly, to a heat dissipating apparatus applied to an electronic device.

2. Related Art

The heat-conducting efficiency of a heat pipe is high. Due to the high efficiency of passive heat dissipation technology, the heat pipe is always applied to a heat dissipation module of a high-end graphic card or other electronic products that cannot adapt heat dissipation fans.

The heat pipe is usually made of a slender and hollow metal pipe with two closed ends with good heat-conducting property. The pipe includes some liquid inside, and the inner side of the pipe wall is processed to have a wicking structure. One end of the slender pipe is positioned closely to the heating source to heat the liquid inside to be vaporized. The vapor moves towards the other end of the pipe, and then the vapor releases the heat through the pipe wall at the other end of the pipe, liquefies again, and is attached to the pipe wall. Since the pipe wall includes a wicking structure, the liquid backflows downwards to the end of the pipe, which is the end close to the heating source, due to the capillary principle. The process repeats, and a heat dissipation cycle system is performed.

In short, after the liquid in the pipe vaporizes, and the vapor releases heat via convection. After the heat is dissipated, the vapor liquefies and backflows in the wicking way, which is similar to the refrigeration of a refrigerator compressor. The heat conducting efficiency of the heat pipe can be hundreds times of that of copper block or silver block. Without the noise made from fans, heat pipes are quiet and the environment temperature is lower.

The graphic card sold on the market usually only includes a heat dissipater not a heat pipe. If the user wants to increase the heat dissipation efficiency and buy an extra graphic card heat dissipater, users has to dismount the original heat dissipater at the graphic card. It is rather inconvenient and the cost is high, which affects the purchasing intention.

SUMMARY OF THE INVENTION

A heat dissipating apparatus is provided. It decreases the installation difficulty, saves assembly time, improves the heat dissipation efficiency and decreases the manufacture cost.

The heat dissipating apparatus comprises a first heat sink, a second heat sink and a fixing unit. The first heat sink comprises a connecting portion, the second heat sink includes a connecting unit, and the connecting unit is inserted to the connecting portion of the first heat sink. The fixing unit comprises an end portion and a body. The body is accommodated in the connecting portion of the first heat sink, and the end portion is exposed outside the connecting portion of the first heat sink.

In sum, the heat dissipating apparatus includes a first heat sink and a second heat sink. The first heat sink and the second heat sink are connected by a connecting unit attached to the first heat sink by a fixing unit. Thus, the heat dissipation efficiency is improved greatly compared to the conventional technology. The second heat sink is fixed by the fixing unit, and thus the user does not need to dismount the original structure of the first heat sink of the graphic card. Consequently, the installation difficulty is decreased, the time is saved, and the manufacture cost and the damage rate of the products are decreased greatly.

These and other features, aspects and advantages of the disclosure will become better understood with regard to the following description, appended claims, and accompanying drawings.

DETAILED DESCRIPTION OF THE INVENTION

A heat dissipating apparatus in the embodiments are illustrated accompanying relating figures.

Figure 1:
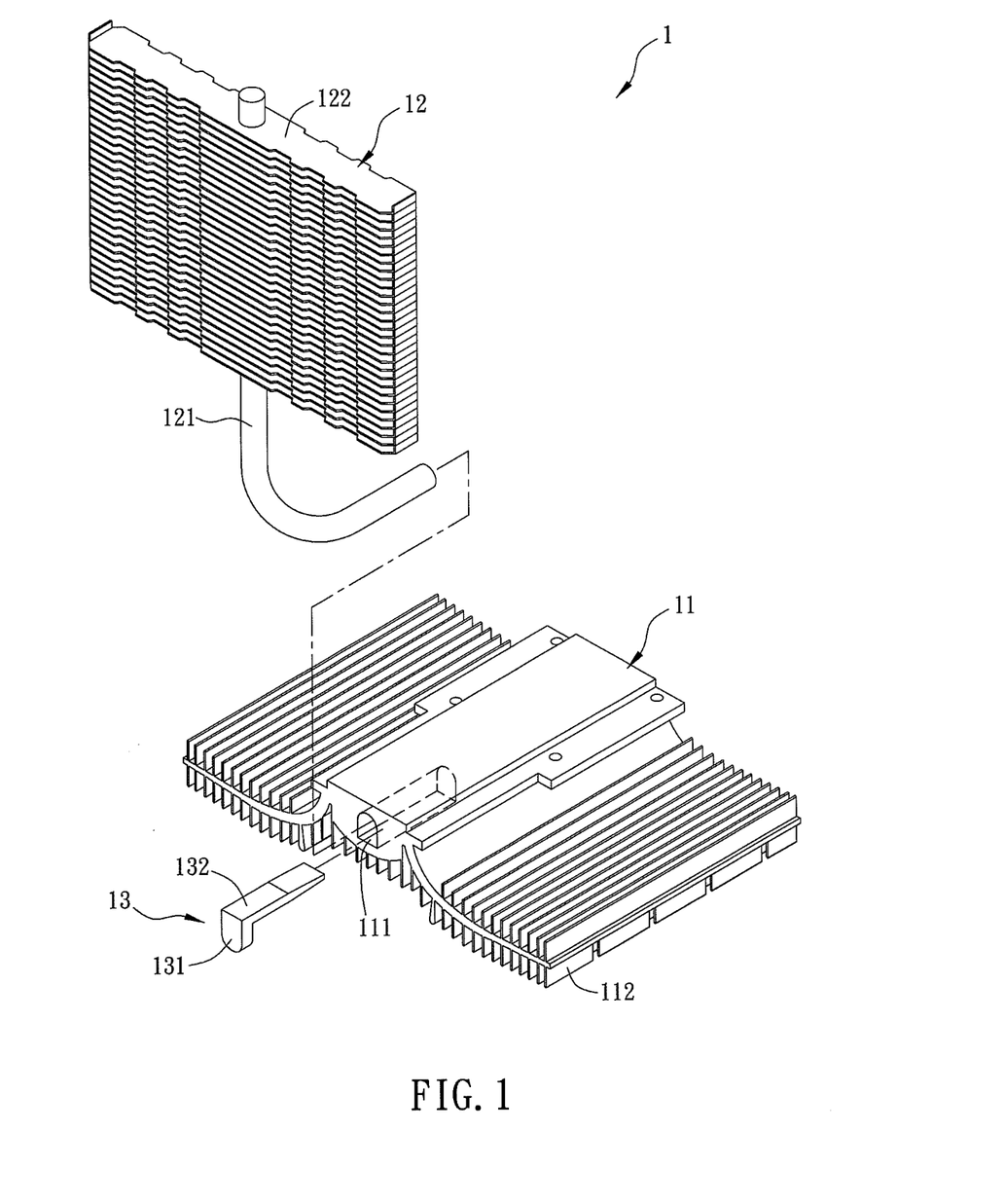
FIG. 1 and FIG. 2 are schematic diagrams showing a heat dissipating apparatus in a first embodiment of the disclosure.
Figure 2:
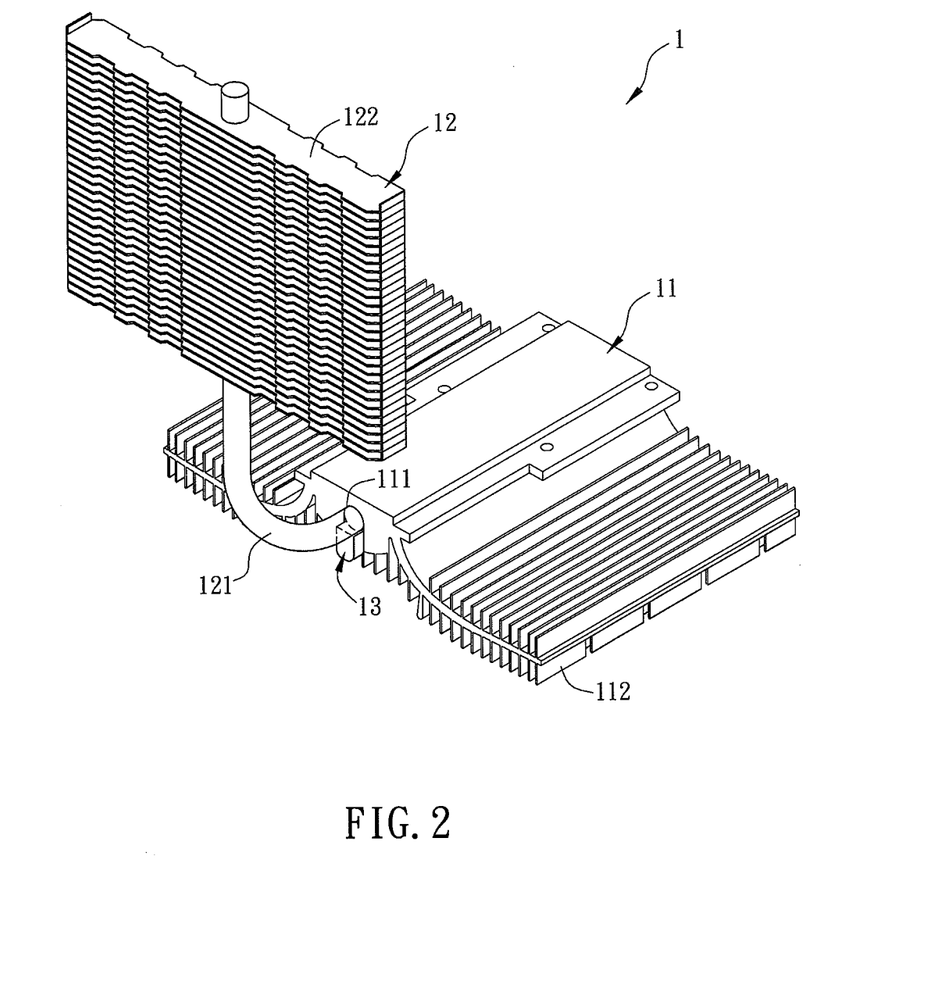
Figure 8:
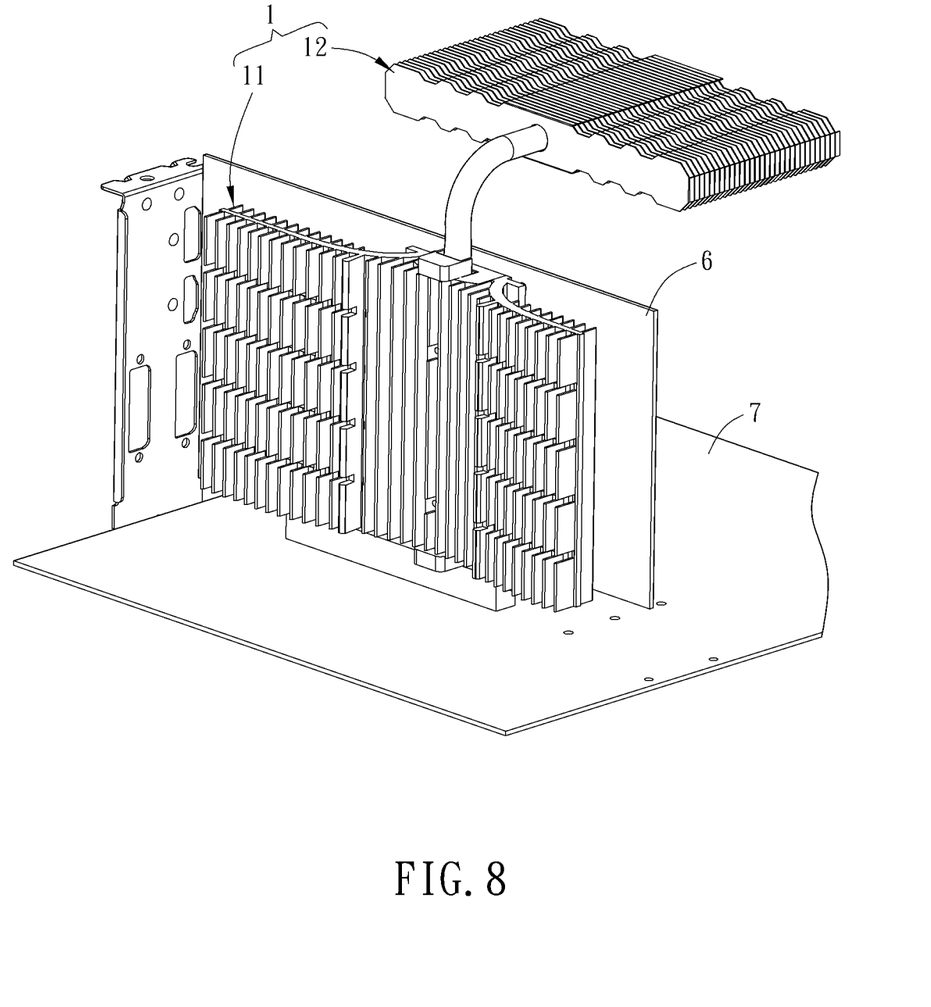
FIG. 8 is a schematic diagram showing the heat dissipating apparatus in accordance with the preferable embodiment of the present invention.

FIG. 1 and FIG. 2 are schematic diagrams showing a heat dissipating apparatus 1 in a first embodiment of the disclosure. The heat dissipating apparatus 1 includes a first heat sink 11, a second heat sink 12 and a fixing unit 13. In practical usage, the heat dissipating apparatus 1 may cooperate with a graphic card, a motherboard or other electronic devices to dissipate heat. As shown in FIG. 8, the heat dissipating apparatus 1 is cooperated with the graphic card 6 and the motherboard 7.

The first heat sink 11 includes a connecting portion 111. The second heat sink 12 includes a connecting unit 121 inserted to the connecting portion 111. The connecting portion 111 may be a through hole or a recess to connect with the connecting unit 121. The connecting unit 121 is a heat pipe structure made of hollow, close-ended metal with good heat-conducting property, such as copper, nickel, stainless steel, tungsten or some alloys. Moreover, the cross section of the connecting unit 121 may be in shape like a square, a circle, a polygon, an irregular shape or a combination of the shapes above.

The inner side of the connecting unit 121 includes a wicking structure, and the connecting unit 121 includes a little amount of liquid therein such as potassium, sodium, indium, cesium, lithium, bismuth, hydrargyrum, water, methanol, acetone, freons liquid nitrogen, liquid oxygen and some inorganic salt.

In the embodiment, the connecting portion 111 is a recess, and the connecting unit 121 includes a bending portion which makes the connecting unit 121 L-shaped. The bending angle of the bending portion may be adjusted according to the requirements.

The fixing unit 13 includes an end portion 131 and a body 132. The fixing unit 13 is inserted to one end of the connecting portion 111 for the body 132 accommodated in the connecting portion 111. The connecting unit 121 of the second heat sink 12 is abutted against the connecting portion 111 of the first heat sink 11 via the fixing unit 13. Moreover, the end portion 131 of the fixing unit 13 is exposed from the connecting portion 111 to facilitate the user holding and applying force when the user dismounts the fixing unit 13.

The material of the fixing unit 13 may be phenolic resin, unsaturated polyester resin, epoxy resin, silicone grease, wood or metal which can provide proper viscosity, flexibility and thermostability to make the fixing unit 13 fastened into the connecting unit 121 at the connecting portion 111. The fixing unit 13 may be made of soft metal such as gold, tin, palladium, platinum, and lead.

The shape of the fixing unit 13 is not limited herein. A surface of the body 132 may be a slope to facilitate inserting the fixing unit 13 to the connecting portion 111 of the first heat sink 11. Another surface of the body 132 may be a horizontal plane abutted against the connecting unit 121 to make the connecting unit 121 attached to the connecting portion 111. In the embodiment, the length of the body 132 of the fixing unit 13 is the same with that of the connecting portion 111 of the first heat sink 11.

In practical usage, the size of the fixing unit 13 can be adjusted according to the size of the connecting portion 111 and the connecting unit 121 to make the connecting portion 111 of the first heat sink abutted against the connecting unit 121 of the second heat sink 12.

In the embodiment, the first heat sink 11 and the second heat sink 12 include a plurality of fins 112 and 122. Furthermore, thin and big fins can increase the contacting area between the heat dissipater and air to improve the heat conducting speed.

Figure 3:
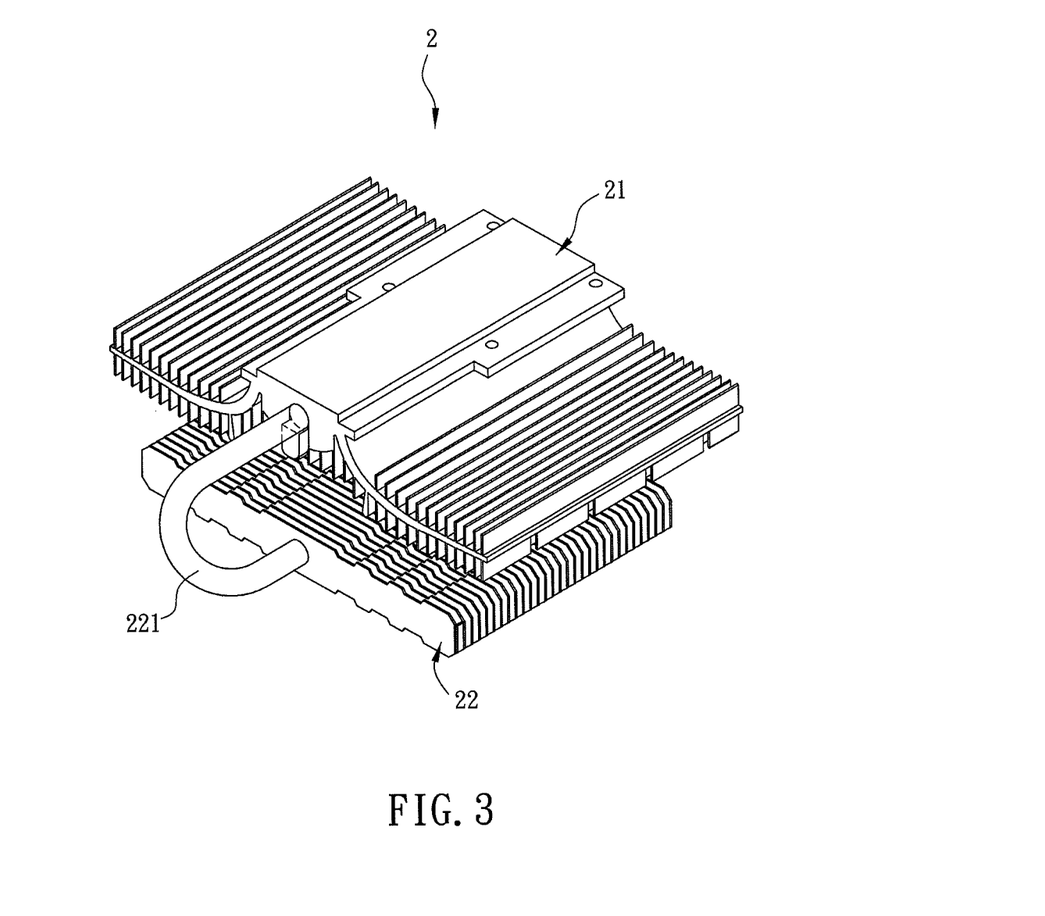
FIG. 3 and FIG. 4 are schematic diagrams showing different forms of a connecting unit of a second heat sink in a first embodiment of the disclosure.
Figure 4:
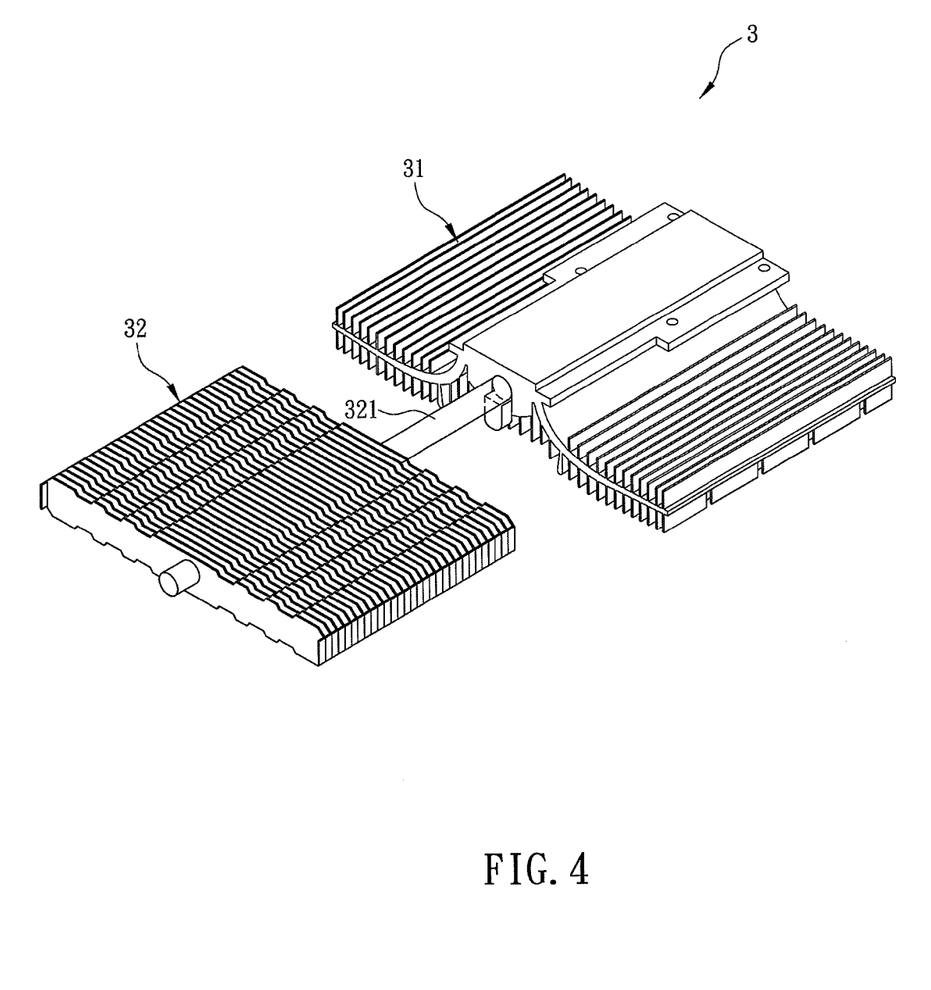

Moreover, in practical usage, the form of the connecting unit of the second heat sink in the heat dissipating apparatus can be changed according to different requirements. FIG. 3 and FIG. 4 are schematic diagrams showing the connecting unit in different forms of the second heat sink in the first embodiment of the disclosure, which are taken as examples to illustrate two structures of the connecting unit.

In FIG. 3, the connecting unit 221 of the second heat sink 22 of the heat dissipating apparatus 2 includes two bending portions, in an embodiment, the bending portions are U-shaped, and the first heat sink 21 is parallel with the second heat sink 22 to save space.

In FIG. 4, the connecting unit 321 of the second heat sink 32 of the heat dissipating apparatus 3 is formed as a column without any bending portion. Moreover, in practical usage, the connecting unit of the second heat sink may be Z-shaped, spiral-shaped or irregular shaped, which is not limited herein, to correspond to various forms of the electronic components. The electronic component may be a graphic card or other heat dissipation components on a motherboard.

Figure 5:
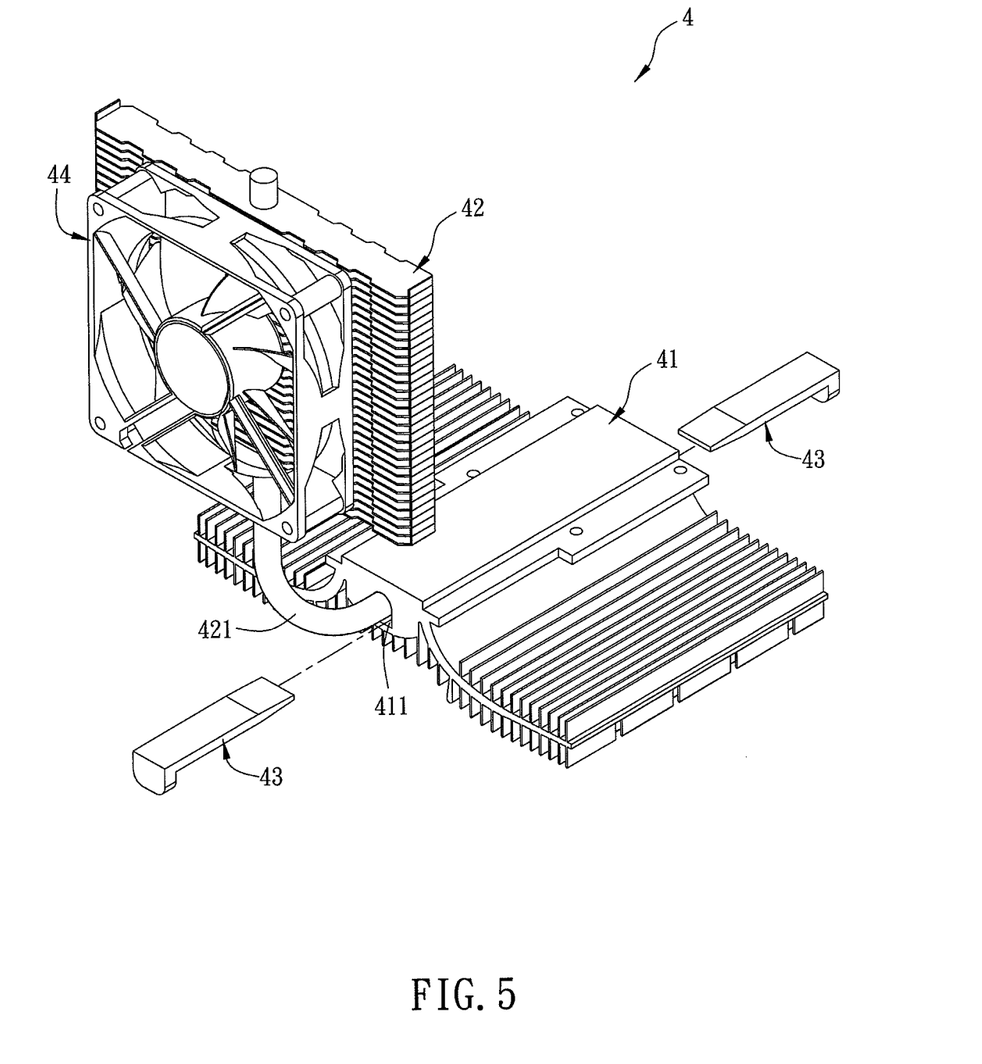
FIG. 5 is a schematic diagram showing a heat dissipating apparatus in a second embodiment of the disclosure.

FIG. 5 is a schematic diagram showing a heat dissipating apparatus 4 in a second embodiment of the disclosure. The difference between the heat dissipating apparatus 4 and the heat dissipating apparatus 1 is that the connecting portion 411 of the first heat sink 41 of the heat dissipating apparatus 4 is a through hole, and the heat dissipating apparatus 4 includes two fixing units 43 and a fan 44.

The fixing unit 43 is inserted to the connecting portion 411 of the first heat sink 41 from two ends to make the connecting unit 421 of the second heat sink 42 abutted against the connecting portion 411 of the first heat sink 41. The fan 44 is connected to the second heat sink 42. The fan 44 also may be coupled to the first heat sink 41 or the second heat sink 42 to improve the heat conducting speed. Multiple fans 44 may also be used according to practical requirements.

Figure 6:
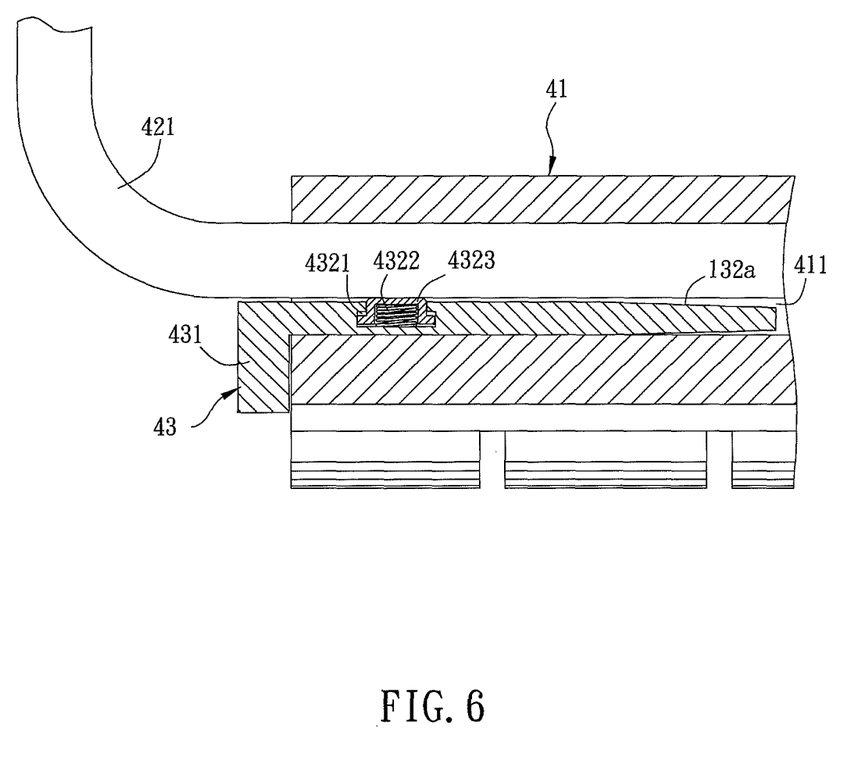
FIG. 6 is a schematic diagram showing a fixing unit of a heat dissipating apparatus in a second embodiment of the disclosure.

In FIG. 6, the fixing unit 43 is further illustrated. A surface of the body 432 of the fixing unit 43 is a slope, and another surface is a horizontal plane. The body 432 includes an accommodation space 4321, an elastic element 4322 and a fastening element 4323. The elastic element 4322 is disposed in the accommodation space 4321. The fastening element 4323 is connected to one end of the elastic element 4322.

When the fixing unit 43 is inserted to the connecting portion 411 which holds the connecting unit 421, the fastening element 4323 is pressed by the connecting unit 421 to be inserted into the accommodation space 4321, and then it compresses the elastic element 4322. When the end portion 431 of the fixing unit 43 is abutted against the first heat sink 41, the fixing unit 43 is fixed. The fastening element 4323 abuts against the connecting unit 421 due to the elastic force of the elastic element 4322, and makes the connecting unit 421 attached to the connecting portion 411. The elastic element 4322 may be an extension spring, a compression spring, a clip, a ball spring or a flexible sleeve.

Figure 7:
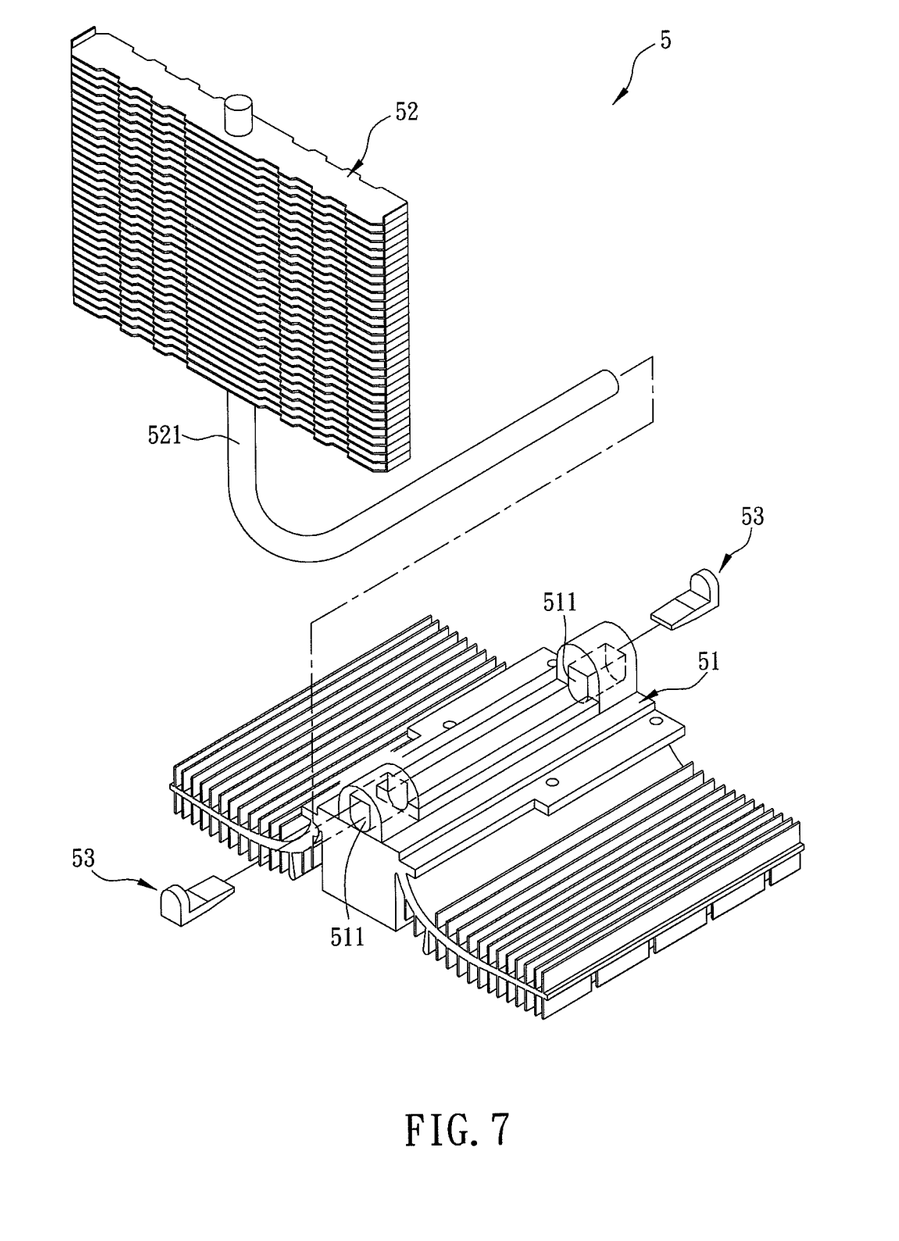
FIG. 7 is a schematic diagram showing a fixing unit of a heat dissipating apparatus in a third embodiment of the disclosure.

FIG. 7 is a schematic diagram showing a fixing unit of a heat dissipating apparatus 5 in a third embodiment of the disclosure. The difference between the heat dissipating apparatus 5 and the heat dissipating apparatus 1 is that the first heat sink 51 of the heat dissipating apparatus 5 includes two connecting portions 511, and the heat dissipating apparatus 5 includes two fixing units 53.

In the embodiment, the connecting unit 521 of the second heat sink 52 is inserted into the connecting portion 511, and a part of the connecting unit 521 is exposed outside the first heat sink 51. Moreover, the fixing units 53 are inserted to the connecting portion 511, respectively, to make the connecting unit 521 abutted against the first heat sink 51. The fixing unit 53 also includes a heat conducting function.

In sum, the heat dissipating apparatus in the embodiments includes a first heat sink and a second heat sink connected via a connecting unit, and the connecting unit is abutted against and fixed to the first heat sink via a fixing unit. Thus, the heat dissipation efficiency is improved. Compared with the conventional technology, by inserting a fixing unit into the second heat sink, the user does not need to dismount the original first heat sink from the graphic card, which is more convenient and save time in installing, and the manufacture cost and the damage rate of the products are decreased greatly.

Although the present disclosure has been described in considerable detail with reference to certain preferred embodiments thereof, the disclosure is not for limiting the scope of the disclosure. Persons having ordinary skill in the art may make various modifications and changes without departing from the scope. Therefore, the scope of the appended claims should not be limited to the description of the preferred embodiments described above.

What is claimed is:

1. A heat dissipating apparatus, comprising:
   a first heat sink having a connecting portion;
   a second heat sink having a connecting unit inserted into the connecting portion; and
   a fixing unit having an end portion and a body, wherein the body is accommodated in the connecting portion, and the end portion is exposed outside the connecting portion;
   wherein the body of the fixing unit further comprises:
   an accommodation space;
   an elastic element disposed in the accommodation space; and a fastening element connected to one end of the elastic element and abutted against the connecting unit.

2. The heat dissipating apparatus according to claim 1, the material of the fixing unit is phenolic resin, unsaturated polyester resin (UPR), epoxy resin, silicone grease, wood or metal.

3. The heat dissipating apparatus according to claim 1, wherein a surface of the body of the fixing unit is a slope.

4. The heat dissipating apparatus according to claim 1, wherein the connecting unit of the second heat sink comprises a bending portion.

5. The heat dissipating apparatus according to claim 1, further comprising:
a fan coupled to the first heat sink or the second heat sink.

6. The heat dissipating apparatus according to claim 1, wherein the elastic element is an extension spring, a compression spring, a clip or a flexible sleeve.

7. The heat dissipating apparatus according to claim 1, wherein the first heat sink and the second heat sink comprise a plurality of fins.

8. An electronic device, comprising:
an electronic component; and
a heat dissipating apparatus disposed cooperating with the electronic component, comprising:
a first heat sink having a connecting portion;
a second heat sink having a connecting unit inserted into the connecting portion; and
a fixing unit having an end portion and a body, wherein the body is accommodated in the connecting portion, and the end portion is exposed outside the connecting portion;
wherein the body of the fixing unit further comprises:
an accommodation space;
an elastic element disposed in the accommodation space; and
a fastening element connected to one end of the elastic element and abutted against the connecting unit.

9. The heat dissipating apparatus according to claim 8, wherein the electronic component is a graphic card or a motherboard.

10. A heat dissipating apparatus, comprising:
a first heat sink having at least a connecting portion;
a second heat sink having a connecting unit inserted to the connecting portion and exposed outside the first heat sink; and
a fixing unit having an end portion and a body, wherein the body is accommodated in the connecting portion, and the end portion is exposed outside the connecting portion;
wherein the body of the fixing unit further comprises:
an accommodation space;
an elastic element disposed in the accommodation space; and
a fastening element connected to one end of the elastic element and abutted against the connecting unit.

\* \* \* \* \*